(12) United States Patent
Chang et al.

(10) Patent No.: US 7,796,193 B2
(45) Date of Patent: Sep. 14, 2010

(54) METHOD OF ADAPTIVE SLICING SIGNAL

(75) Inventors: Wen-Chang Chang, Taichung (TW);
Siou-Shen Lin, Taipei County (TW)

(73) Assignee: Mediatek Inc., Hsin-Chu (TW)

( * ) Notice: Subject to any disclaimer, the term of this patent is extended or adjusted under 35 U.S.C. 154(b) by 1112 days.

(21) Appl. No.: 11/427,390

(22) Filed: Jun. 29, 2006

(65) Prior Publication Data

US 2008/0002056 A1    Jan. 3, 2008

(51) Int. Cl.
*H04N 7/00* (2006.01)
*H04N 11/00* (2006.01)

(52) U.S. Cl. .................. 348/465; 348/466; 348/468; 348/571

(58) Field of Classification Search .......... 348/465, 348/466, 468, 470
See application file for complete search history.

(56) References Cited

U.S. PATENT DOCUMENTS

| 4,318,128 | A | | 3/1982 | Sauvanet | |
|---|---|---|---|---|---|
| 4,667,235 | A | | 5/1987 | Nozoe et al. | |
| 5,301,023 | A | | 4/1994 | Zato | |
| 5,715,011 | A | | 2/1998 | Bramwell | |
| 5,805,234 | A | * | 9/1998 | Matsuura | 348/558 |
| 6,285,403 | B1 | | 9/2001 | Lee | |
| 6,295,093 | B1 | * | 9/2001 | Park et al. | 348/473 |
| 6,377,308 | B1 | * | 4/2002 | Cahill, III | 348/461 |
| 6,381,287 | B1 | * | 4/2002 | Shin | 375/316 |
| 6,839,091 | B1 | * | 1/2005 | Hebbalalu et al. | 348/465 |
| 7,046,298 | B2 | * | 5/2006 | Kuzumoto et al. | 348/465 |
| 7,098,960 | B2 | * | 8/2006 | Suzuki et al. | 348/465 |
| 7,463,308 | B2 | * | 12/2008 | Yamasaki et al. | 348/465 |
| 7,599,003 | B2 | * | 10/2009 | Suzuki et al. | 348/465 |
| 7,599,004 | B2 | * | 10/2009 | Shin et al. | 348/478 |
| 2002/0008776 | A1 | * | 1/2002 | Kuzumoto et al. | 348/468 |
| 2002/0140856 | A1 | * | 10/2002 | Inoue | 348/465 |
| 2003/0184677 | A1 | * | 10/2003 | Kuzumoto et al. | 348/465 |
| 2005/0195326 | A1 | * | 9/2005 | Kudou | 348/465 |
| 2007/0019108 | A1 | * | 1/2007 | Park et al. | 348/468 |
| 2007/0030386 | A1 | * | 2/2007 | Cha et al. | 348/468 |
| 2007/0252902 | A1 | * | 11/2007 | Lin et al. | 348/231.4 |

* cited by examiner

*Primary Examiner*—Brian P Yenke
(74) *Attorney, Agent, or Firm*—Thomas, Kayden, Horstemeyer & Risley

(57) ABSTRACT

A video signal processing system for slicing binary data transmitted in a video signal is provided, comprising a synchronous separator, a line counter, a slicing signal generator and a comparator. The synchronous separator detects Hsync and Vsync carried in the video signal. The line counter generates an enable signal by counting the number of scanning lines based on the detected Hsync and Vsync, wherein the enable signal is activate when the video signal carrying teletext and/or other binary data. The slicing signal generator further comprises an extreme value detector determining local maximum values and local minimum values of the video signal, and a slicing level determiner generating an adaptive slicing signal based on the local maximum values and the local minimum values. The comparator enabled by the enable signal compares the video signal with the slicing signal.

13 Claims, 7 Drawing Sheets

METHOD OF ADAPTIVE SLICING SIGNAL

BACKGROUND OF THE INVENTION

1. Field of the Invention

The present invention relates to a slicing signal generator, and more particularly to a slicing signal generator providing an adaptive slicing signal.

2. Description of the Related Art

Teletext carried by a TV/video signal at a VBI (vertical blanking interval) has been popularly used in TV broadcasts to provide real-time information such as weather, advertising, movie and flight schedules. To decode the teletext data carried by the TV/video signal, a slicing signal is applied. The slicing signal provides a slicing level to be compared with the TV/video signal. When the TV/video signal exceeds the slicing level, the data carried by the TV/video signal is determined as logic 1, and when the TV/video signal does not exceed the slicing level, the data carried by the TV/video signal is determined as logic 0. FIG. 1 illustrates a waveform and corresponding slicing result of a TV signal. The VBI can be divided into clock-run-in, start code (not shown in FIG. 1), and teletext data. The slicing level is typically determined by the signal amplitude during the clock-run-in interval, for example, the slicing level is the average amplitude of the TV signal received during clock-run-in interval. FIG. 2 is a block diagram of a slicing signal generator. The clock-run-in window generates an enable signal to turn on the gate 21 for the clock-run-in interval. When the gate 21 is turned on, the TV signal is passed to an average computer unit 22 to compute a slicing signal. When the TV signal is distorted by noise, the teletext data carried by the TV signal may be incorrectly decoded according to the slicing signal derived from the clock-run-in interval. FIG. 3 is a waveform of a TV signal with noise. In FIG. 3, the DC (direct current) component of the TV signal varies significantly while delivering the actual teletex data, thus the slicing signal derived from the clock-run-in interval is inappropriate.

BRIEF SUMMARY OF THE INVENTION

A slicing signal generator generates an adaptive slicing signal for a TV/video signal, and a decoding system with the slicing signal generator decodes the TV/video signal.

A slicing signal generator for a video signal comprises an extreme value detector, a first filter, a second filter and a computing unit. The extreme value detector determines a plurality of local maximum and local minimum values of the video signal. The first filter generates a local maximum envelope based on the local maximum values. The second filter generates a local minimum envelope based on the local minimum values. The computing unit generates a slicing signal based on the local maximum envelope and the local minimum envelope.

A slicing signal generator for a video signal comprises an extreme value detector, a computing unit and a filter. The extreme value detector determines a plurality of local maximum values and local minimum values of the video signal. The computing unit generates a plurality of weighted values based on the corresponding local maximum values and the corresponding local minimum values. The filter generates a slicing signal based on the weighted values.

A slicing signal generator for a video signal comprises an extreme value detector, a NOR gate, a switch unit, a median computing unit and a filter. The extreme value detector generates a first valid signal and a second valid signal, wherein when a local maximum value is determined, the first valid signal is at a logic high level and when a local minimum value is determined, the second valid signal is at a logic high level. The NOR gate receives the first valid signal and the second valid signal to generate an enable signal. The switch unit is turned on when the enable signal is at the logic high level. The median computing unit coupled to the switch generates a plurality of median values of the data signal except for the local maximum values and the local minimum values. The filter generates a slicing signal based on the median values.

A video signal decoding system for a TV signal comprises a synchronous separator, a line counter, a slicing signal generator and a comparator. The synchronous separator detects Hsync and Vsync in the video signal. The line counter counts the number of scanning lines of the TV signal according to the Hsync and Vsync, and when the count number reaches a predetermined value, the video signal decoding system receives TV signal carrying teletext information, thus, the line counter generates an enable signal. The slicing signal generator generates a slicing signal for the TV signal, where the slicing signal is adaptable to the TV signal. The comparator enabled by the enable signal compares the TV signal with the slicing signal, and outputs teletext data.

A method for slicing data carried on a data signal of a video signal, comprises separating Hsync and Vsync from the video signal, determining local maximum values and local minimum values of the data signal, generating a slicing signal based on the local maximum values and the local minimum values, generating an enable signal that is active when the video signal carrying teletext and/or other binary data, when the enable signal is active, comparing the video signal with the slicing signal.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

This following description is made for the purpose of illustrating the general principles of the invention and should not be taken in a limiting sense. The scope of the invention is best determined by reference to the appended claims.

Figure 1:
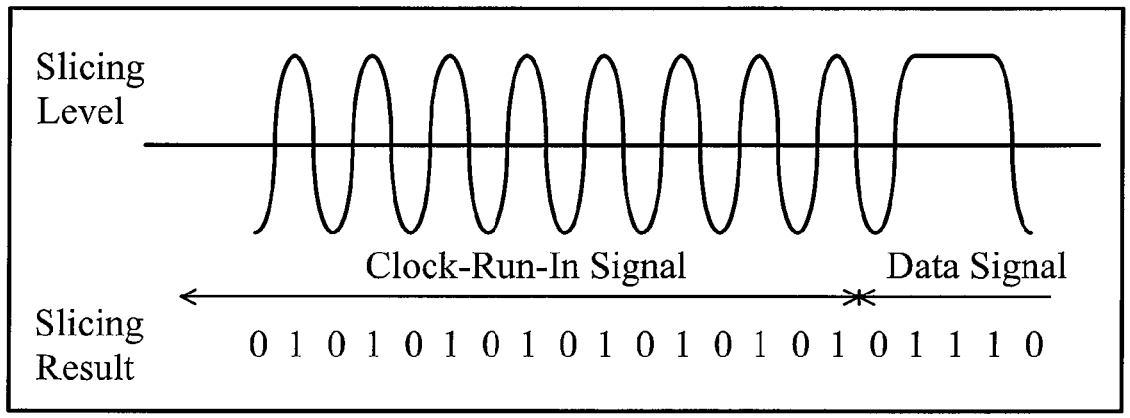
FIG. 1 illustrates a waveform and a slicing result of a TV signal.
Figure 2:
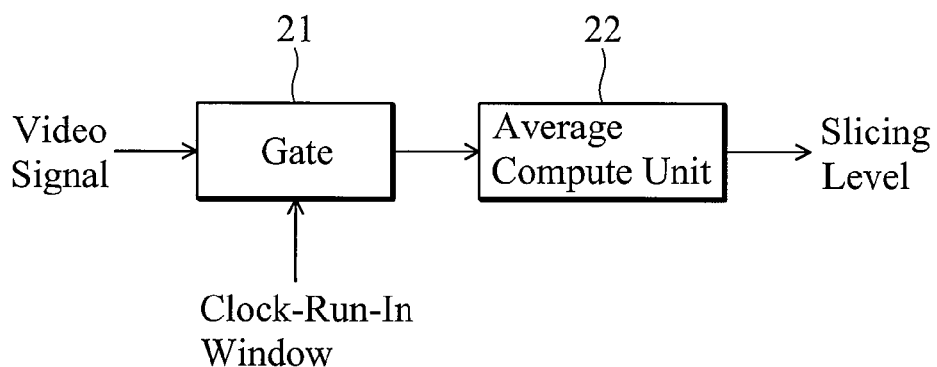
FIG. 2 is a block diagram of a conventional slicing signal generator.
Figure 3:
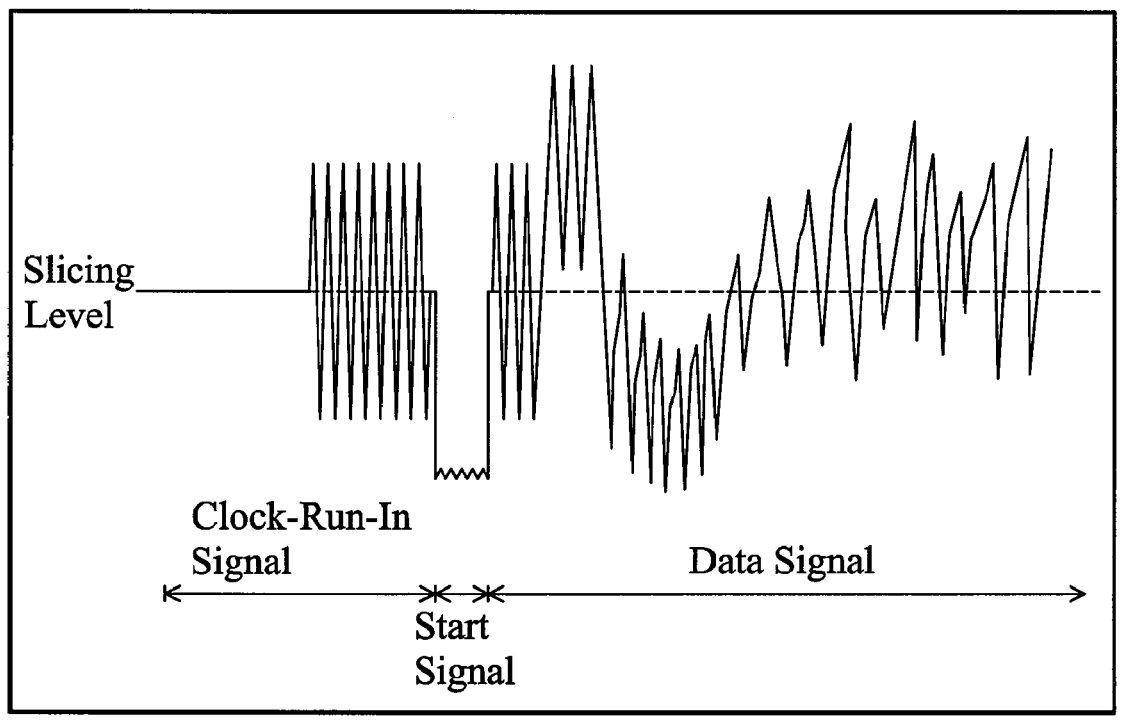
FIG. 3 shows a waveform of a TV signal with noise.
Figure 4:
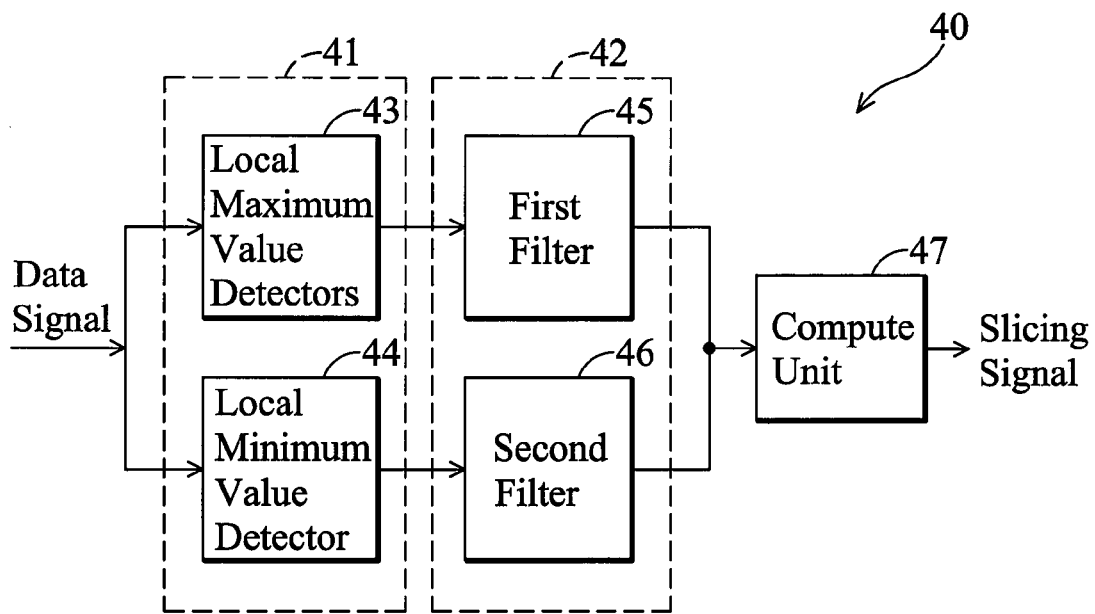
FIG. 4 is a block diagram of an embodiment of a slicing signal generator.

FIG. 4 is a block diagram of an embodiment of a slicing signal generator. The slicing signal generator 40 comprises an extreme value detector 41, a filter module 42 and a computing unit 47. The extreme value detector 41 determines a plurality of local maximum and local minimum values of the TV signal. In this embodiment, the extreme value detector 41 comprises a local maximum value detector 43 and a local minimum value detector 44 respectively determining the local maximum values and the local minimum values. Filter module 42 receives the local maximum values and the local minimum values to generate a local maximum envelope and a local minimum envelope. In this embodiment, the filter module 42 comprises a first filter 45 coupled to the local maximum value detector 43 and a second filter 46 coupled to the local minimum value detector 44. The FIR (Finite Impulse Response) filter and the IIR (Infinite Impulse Response) filter are exemplary embodiments of the first filter 45 and the second filter 46. A purpose of the filters 45 and 46 is to filter out outliers to improve the noise robustness of the input of the computing unit 47. The computing unit 47 generates the slicing signal based on the received local maximum envelope and local minimum envelope. In some embodiments, the slicing signal is the average of the local maximum envelope and the local minimum envelope. In some other embodiments, the slicing signal is a weighted average of the local maximum envelope and the local minimum envelope. The slicing signal is adaptable to the TV signal, so that the sliced data may achieves error robustness to rapid shift in DC level of the TV signal as shown in FIG. 3.

Figure 5:
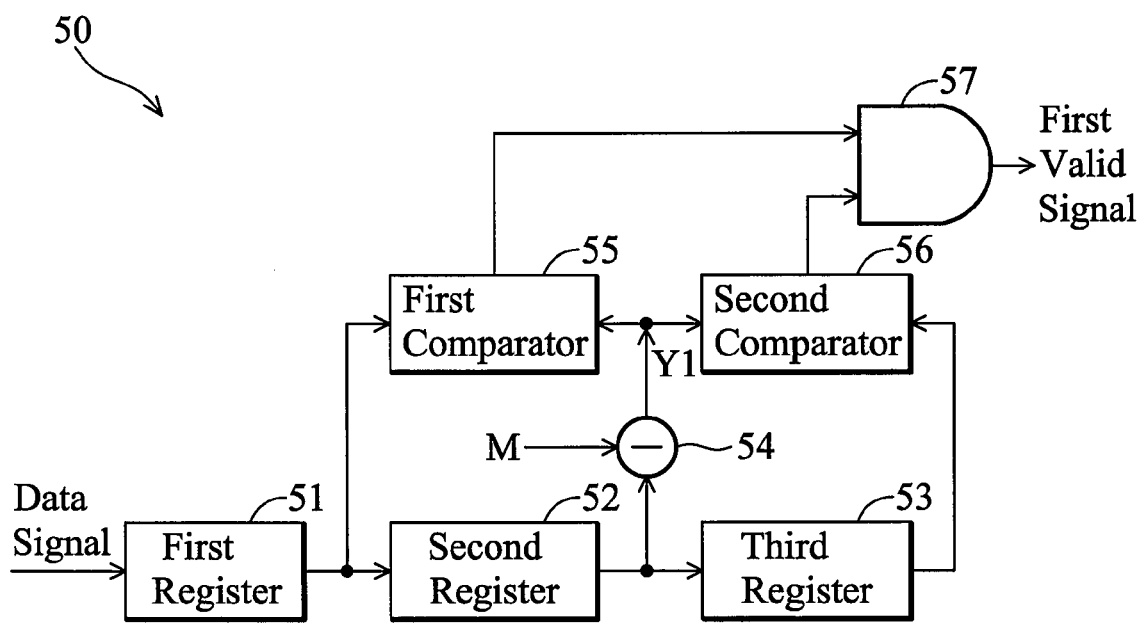
FIG. 5 is a block diagram of an embodiment of a local maximum value detector.

FIG. 5 is a block diagram of an embodiment of a local maximum value detector. Local maximum value detector 50 comprises a first register 51, a second register 52, a third register 53, a subtractor 54, a first comparator 55, a second comparator 56 and a AND gate 57. The first register 51 stores the (n+2)th data of the data signal, X[n+2]. The second register 52 stores the (n+1)th data of the data signal, X[n+1]. The third register 53 stores the nth data of the data signal, X[n]. In this embodiment, when X[n+1] exceeds X[n+2] and X[n] with a predetermined value, M, X[n+1] is determined to be a local maximum value. Thus, a subtractor 54 is applied to generate the difference Y1 between the M and X[n+1]. The first comparator 55 compares Y1 with X[n+2] to generate a first signal, wherein when Y1 exceeds X[n+2], the first signal is at logic high level. The second comparator 56 compares Y1 with X[n] to generate a second signal, wherein when Y1 exceeds X[n], the second signal is at logic high level. The AND gate 57 receives the first signal and the second signal to generate a first valid signal. When the first valid signal is at logic high level, X[n+1] is determined as a local maximum value and transmitted to the filter, such as the filter module 42 or the first filter 45.

Figure 6:
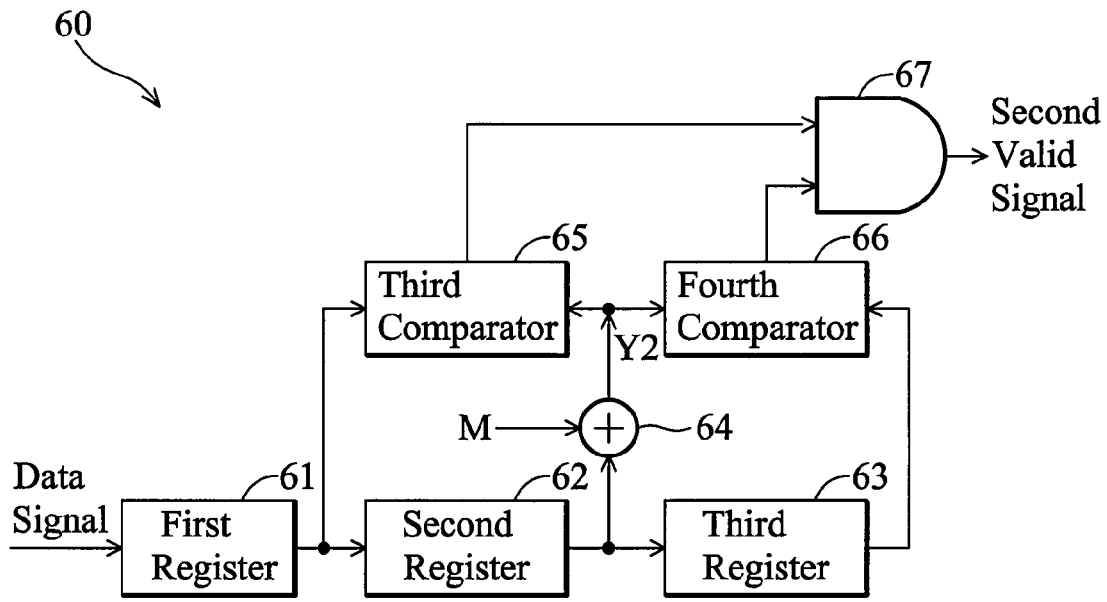
FIG. 6 is a block diagram of an embodiment of a local minimum value detector.

FIG. 6 is a block diagram of an embodiment of a local minimum value detector. Local maximum value detector 60 comprises a first register 61, a second register 62, a third register 63, an adder 64, a third comparator 65, a fourth comparator 66 and an AND gate 67. The first register 61 stores the (n+2)th data of the data signal, X[n+2]. The second register 62 stores the (n+1)th data of the data signal, X[n+1]. The third register 63 stores the nth data of the data signal, X[n]. In this embodiment, when X[n+2] exceeds X[n+1] with a predetermined value, M, and X[n] exceeds X[n+1] with a predetermined value, M, X[n+1] is determined as a local minimum value. Thus, an subtractor 54 is applied to generate the sum Y2 of X[n+1] and M. The third comparator 65 compares X[n+2] with Y2 to generate a third signal, wherein when X[n+2] exceeds Y2, the third signal is at logic high level. The fourth comparator 66 compares X[n] with Y2 to generate a fourth signal, wherein when X[n] exceeds Y2, the fourth signal is at logic high level. The AND gate 67 receives the third signal and the fourth signal to generate a second valid signal. When the second valid signal is at logic high level, X[n+1] is determined as a local minimum value and transmitted to the filter, such as the filter module 42 or the second filter 46.

Figure 7:
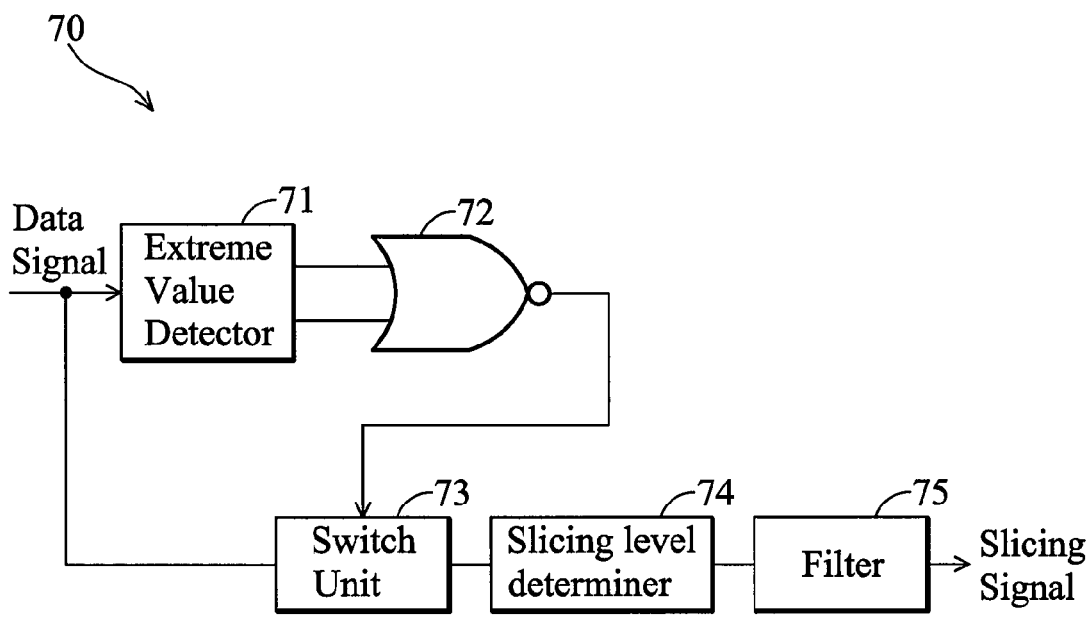
FIG. 7 is a block diagram of another embodiment of the slicing signal generator.

FIG. 7 is a block diagram of another embodiment of the slicing signal generator. The slicing signal generator 70 comprises an extreme value detector 71, a NOR gate 72, a switch unit 73, a slicing level determiner 74 and a filter 75. FIR (Finite Impulse Response) filters and IIR (Infinite Impulse Response) filters are exemplary embodiments of the filter 75. The extreme value detector 71 generates a first valid signal and a second valid signal according to the data signal. When a local maximum value or a local minimum value is determined, the first valid signal or the second valid signal is at logic high level, thus, an enable signal generated by the NOR gate 72 is active. When the enable signal is at logic low level, the switch unit 73 turns off, thus, the slicing level determiner cannot receive the data signal. In one exemplary embodiment, the slicing level determiner 74 filters out local maximum values and local minimum values, and generates and transmits medians of the remaining data signal to the filter 75. In another embodiment, the slicing level determiner 74 reserves only the local maximum values and the local minimum values, and generates and transmits weighted values of the local maximum values and the local minimum values to the filter 75. Then, the filter 75 generates the slicing signal according to the data from the slicing level determiner 74.

Figure 8:
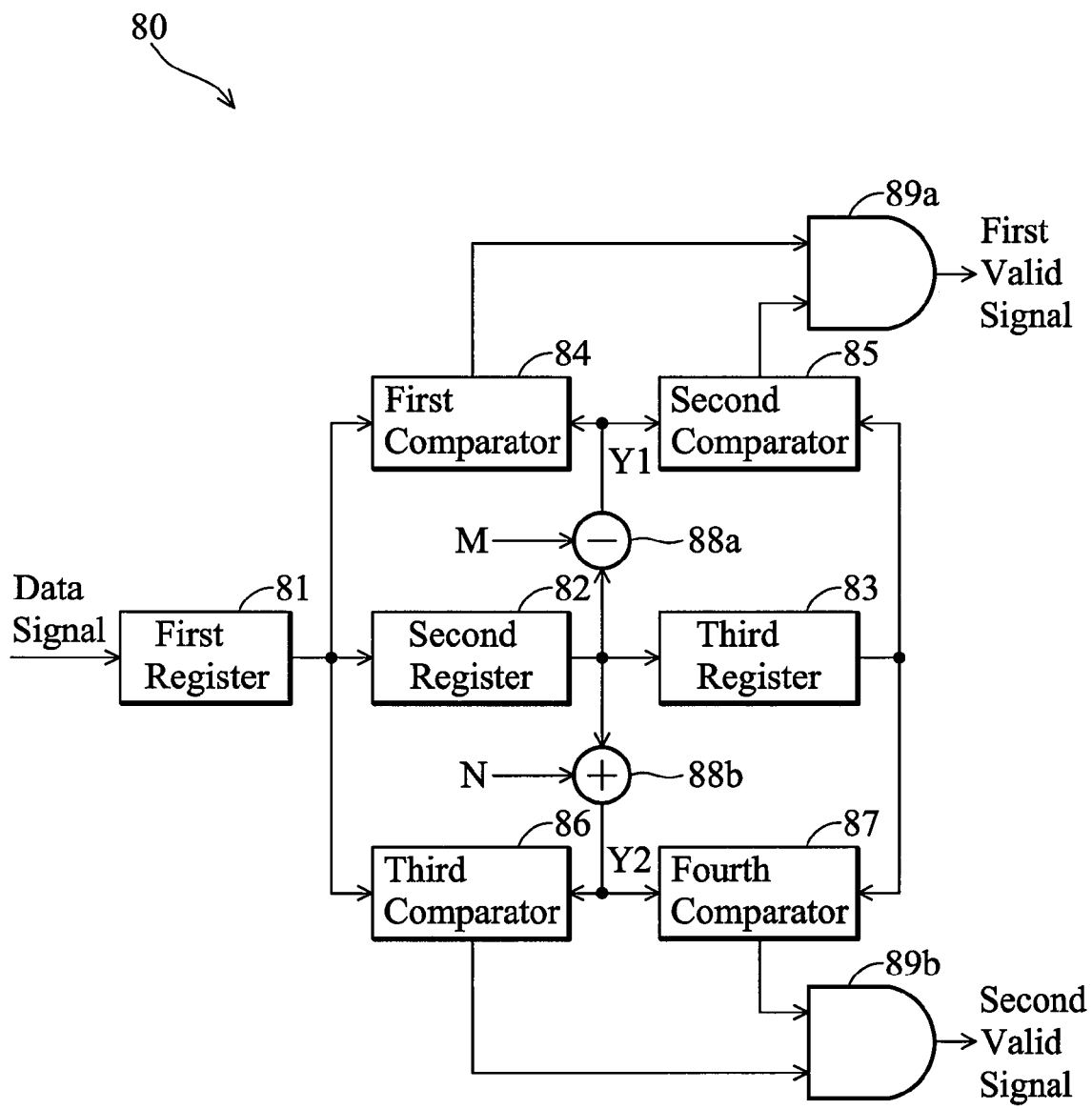
FIG. 8 is a block diagram of an embodiment of the extreme value detector.

FIG. 8 is a block diagram of an embodiment of the extreme value detector. The extreme value detector 80 comprises a first register 81, a second register 82, a third register 83, a subtractor 88a, an adder 88b, a first comparator 84, a second comparator 85, a third comparator 86, a fourth comparator 87, a first AND gate 89a and a second AND gate 89b. The first register 81 stores the (n+2)th data of the data signal, X[n+2]. The second register 82 stores the (n+1)th data of the data signal, X[n+1]. The third register 83 stores the nth data of the data signal, X[n]. In this embodiment, when X[n+1] exceeds X[n+2] and X[n] with a predetermined value, M, X[n+1] is determined to be a local maximum value. Thus, a subtractor 88a is applied to generate the difference Y1 between the M and X[n+1]. The first comparator 84 compares Y1 with X[n+2] to generate a first signal, wherein when Y1 exceeds X[n+2], the first signal is at logic high level. The second comparator 85 compares Y1 with X[n] to generate a second signal, wherein when Y1 exceeds X[n], the second signal is at logic high level. The AND gate 89a receives the first signal and the second signal to generate the first valid signal. In this embodiment, when X[n+2] exceeds X[n+1] with a predetermined value, N, and X[n] exceeds X[n+1] with a predetermined value, N, X[n+1] is determined as a local minimum value. In a preferred example, M is equal to N. Thus, an adder 88b is applied to generate the sum Y2 of X[n+1] and N. The third comparator 86 compares X[n+2] with Y2 to generate a third signal, wherein when X[n+2] exceeds Y2, the third signal is at logic high level. The fourth comparator 87 compares X[n] with Y2 to generate a fourth signal, wherein when X[n] exceeds Y2, the fourth signal is at logic high level. The AND gate 89b receives the third signal and the fourth signal to generate the second valid signal.

Figure 9:
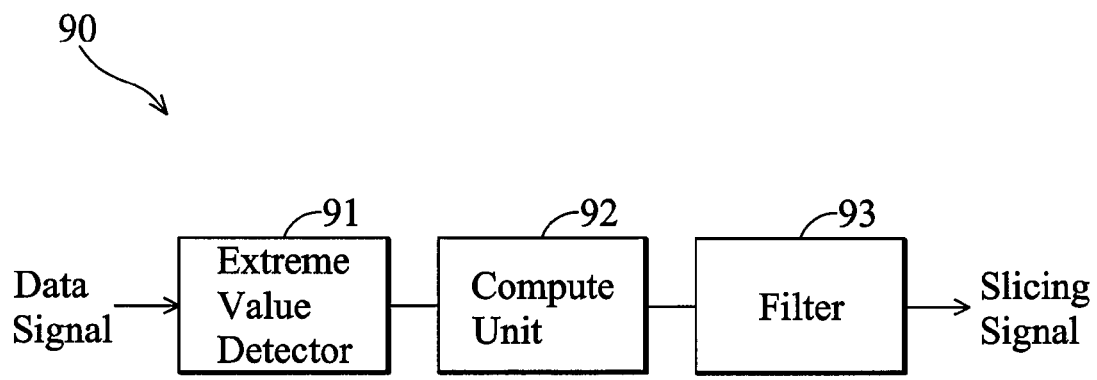
FIG. 9 is a block diagram of another embodiment of the slicing signal generator.

FIG. 9 is a block diagram of another embodiment of the slicing signal generator. The slicing signal generator 90 comprises an extreme value detector 91, a computing unit 92 and a filter 93. The extreme value detector 91 determines and transmits the local maximum values and local minimum values of the data signal to the computing unit 92. The computing unit 92 calculates the average values or the weighted average values of the local maximum values and local minimum values. Thus, the filter 93 generates a slicing signal based on the average values or the weighted average values from the computing unit 92.

Figure 10:
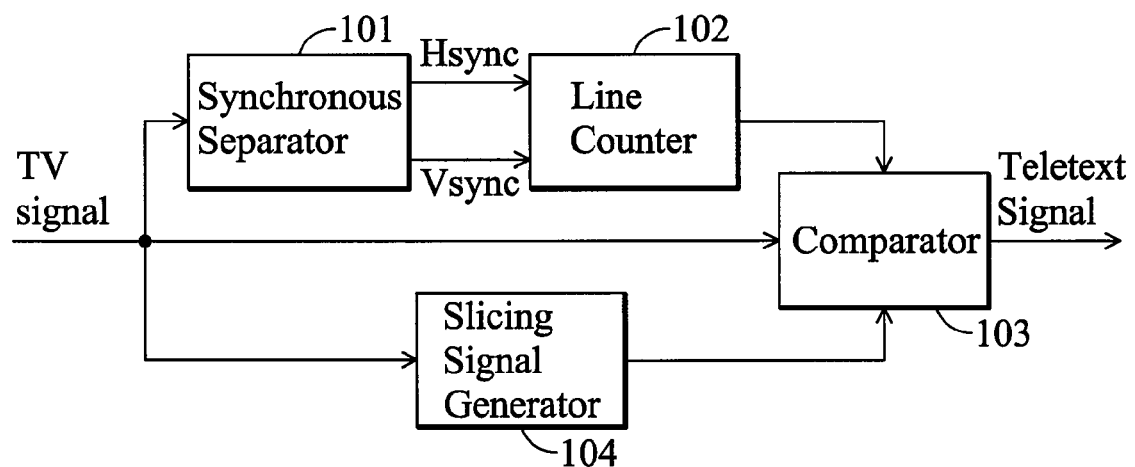
FIG. 10 is a block diagram of an embodiment of the video signal decoding system.

FIG. 10 is a block diagram of an embodiment of the video signal decoding system. The synchronous separator 101 detects Hsync and Vsync in the TV signal. The line counter 102 counts the number of scanning line of the TV signal according to the detected Hsync and Vsync. When the count number reaches a predetermined value, the decoding system determines the receiving TV signal is at VBI, which carries the teletext information, thus, the line counter 102 transmits an enable signal to turn on the comparator 103. The slicing signal generator 104, generates the slicing signal for the comparator 103. The comparator 103 compares the TV signal with the slicing signal when the line counter 102 sends the enable signal. The comparator 103 determines the teletext data carried by the TV signal.

Figure 11:
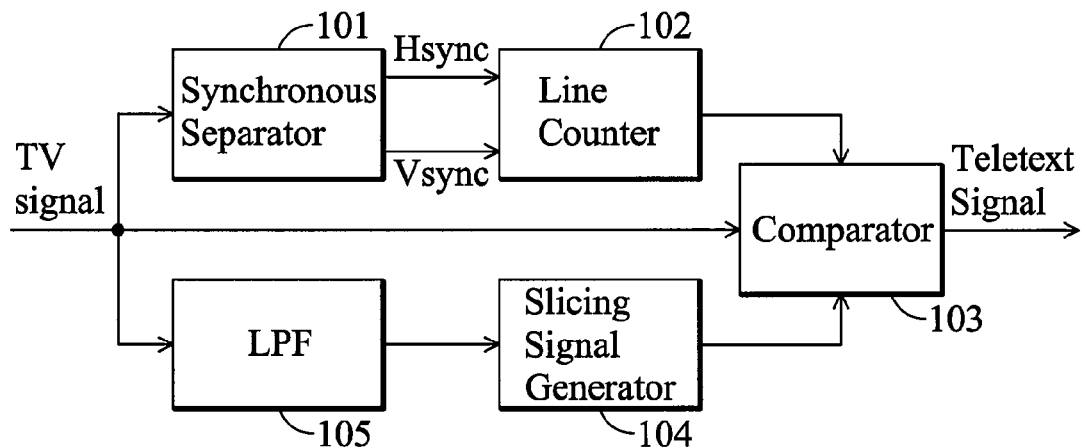
FIG. 11 is a block diagram of the video signal decoding system of FIG. 10 with a low pass filter.
Figure 12:
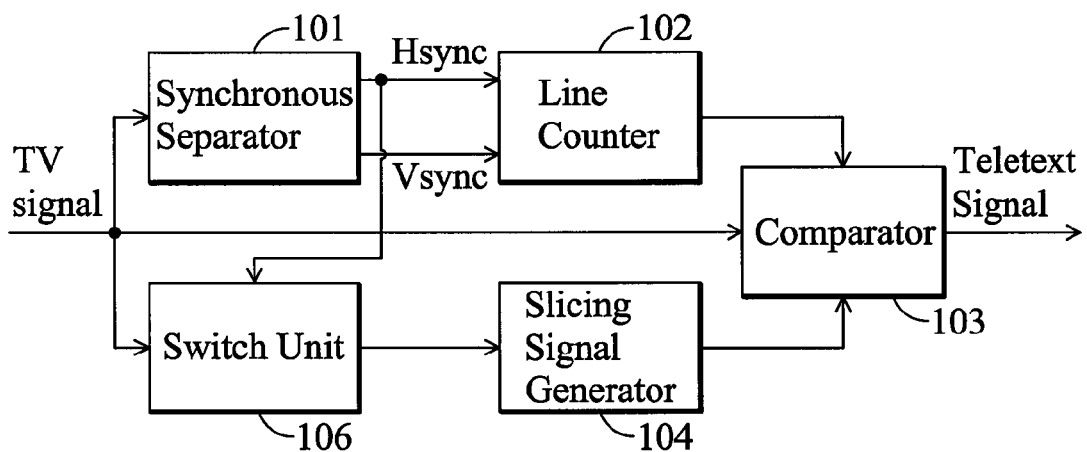
FIG. 12 is a block diagram of the video signal decoding system of FIG. 10 with a switch unit.

When the noise of the TV signal is expected to be large, a plurality of invalid local maximum or local minimum values may be generated, and therefore a low pass filter (LPF) 105 is preferably added to reduce the noise as shown in FIG. 11. Furthermore, a switch unit 106 as shown in FIG. 12 is added to improve the performance of the decoding system. The signal amplitude is generally lower during the Hsync interval if comparing to the remaining TV signal. In order to eliminate the influence of the Hsync interval to the slicing level computation, a switch unit 125 controlled by a control signal do not transmit the TV signal during the Hsync interval to the slicing signal generator.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video signal processing system for slicing binary data transmitted in a video signal, comprising:
   a synchronous separator detecting Hsync and Vsync carried in the video signal;
   a line counter generating a first enable signal by counting the number of scanning lines based on the detected Hsync and Vsync, wherein the first enable signal is active when the video signal carrying teletext and/or other binary data;
   a slicing signal generator comprising:
      an extreme value detector determining local maximum values and local minimum values of the video signal;
      a NOR gate receiving the local maximum values and the local minimum values from the extreme value detector for generating a second enable signal;
      a switch unit receiving the second enable signal and the video signal; and
      a slicing level determiner generating an adaptive slicing signal based on the local maximum values and the local minimum values;
      wherein the switch unit only passes the video signal to the slicing level determiner when the second enable signal is active, thereby the slicing level determiner receives values not determined as the local maximum values or local minimum values; and
   a comparator enabled by the first enable signal to compare the video signal with the slicing signal.

2. The system as claimed in claim 1, wherein the slicing signal generator further comprises a filter coupled to the slicing level determiner to elevate noise robustness of the slicing signal generated by the slicing signal generator.

3. The system as claimed in claim 2, wherein the filter comprises a first filter and a second filter respectively receiving the local maximum values and the local minimum values from the extreme value detector.

4. The system as claimed in claim 1, further comprising a low pass filter coupled to the input of the slicing signal generator to filter high frequency noise of the video signal.

5. The system as claimed in claim 1, wherein the first enable signal generated by the line counter is inactive during an Hsync interval.

6. The system as claimed in claim 1, further comprising a switch device coupled to the input of the slicing signal generator, disabling the slicing signal generator to receive the video signal at a certain period of the video signal.

7. The system as claimed in claim 6, wherein the switch device receives the Hsync detected by the synchronous separator and disables the slicing signal generator to receive the video signal during an Hsync interval.

8. The system as claimed in claim 1, wherein the slicing level determiner of the slicing signal generator generates the adaptive slicing signal by averaging the local maximum values and the local minimum values.

9. The system as claimed in claim 8, wherein the slicing level determiner averages the local maximum values and the local minimum values based on a weight.

10. A method for slicing data carried on a data signal of a video signal, comprising:
   separating Hsync and Vsync from the video signal;
   determining local maximum values and local minimum values of the data signal;
   generating a second enable signal according to the local maximum values and the local minimum values;
   according to the second enable signal, providing values of the video signal not determined as the local maximum value or local minimum values to generate a slicing signal;
   generating a first enable signal that is active when the video signal carrying teletext and/or other binary data; and
   when the first enable signal is active, comparing the video signal with the slicing signal.

11. The method as claimed in claim 10, wherein the step of generating a slicing signal comprises:
   generating a local maximum envelope based on the local maximum values by a filter; and
   generating a local minimum envelope based on the local minimum values by the filter, wherein the slicing signal is generated based on weighted value of the local maximum envelope and the local minimum envelope.

12. The method as claimed in claim 10, wherein the step of generating a slicing signal comprises:
   generating a plurality of weighted values of the local maximum values and the local minimum values; and
   applying the weighted values to a IIR filter or a FIR filter to generate the slicing signal.

13. The method as claimed in claim 10, wherein the step of generating a slicing signal comprises:
   abandoning the local maximum values and the local minimum values;
   determining a plurality of median values of the remaining data signal; and
   applying the median values to a IIR filter or a FIR filter to generate the slicing signal.

* * * * *